United States Patent
Kakade et al.

(10) Patent No.: US 8,412,771 B2
(45) Date of Patent: Apr. 2, 2013

(54) MATCHING ITEMS OF USER-GENERATED CONTENT TO ENTITIES

(75) Inventors: Vinay Kakade, Sunnyvale, CA (US); Bo Pang, Sunnyvale, CA (US); Nilesh Dalvi, Menlo Park, CA (US); Shanmugasundaram Ravikumar, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 167 days.

(21) Appl. No.: 12/909,766

(22) Filed: Oct. 21, 2010

(65) Prior Publication Data

US 2012/0102104 A1    Apr. 26, 2012

(51) Int. Cl.
G06F 15/16    (2006.01)
(52) U.S. Cl. ....................................... 709/204
(58) Field of Classification Search ............ 709/204; 707/740, 758
See application file for complete search history.

(56) References Cited

U.S. PATENT DOCUMENTS

| | | | |
|---|---|---|---|
| 2006/0129446 | A1 | 6/2006 | Ruhl et al. |
| 2007/0136245 | A1 | 6/2007 | Hess et al. |
| 2009/0320119 | A1* | 12/2009 | Hicks et al. ............ 726/9 |
| 2010/0057743 | A1 | 3/2010 | Pierce |
| 2011/0004831 | A1* | 1/2011 | Steinberg et al. ......... 715/753 |
| 2011/0060746 | A1 | 3/2011 | Dalvi et al. |

OTHER PUBLICATIONS

"Notification of Transmittal of the International Search Report and the Written Opinion of the International Searching Authority, or the Declaration" in PCT Application No. PCT/US11/54761 dated Apr. 27, 2012 (9 pages).
Current Claims of PCT/US11/54761 dated Apr. 2012 (4 pages).
Dalvi, et al, "Matching Reviews to Objects using a Language Model," Proceedings of 2009 Conference on Empirical Methods in Natural Language Processing, pp. 609-618, Singapore, Aug. 6-7, 2009.
Crunch Base, "Buddy Media" http://www.crunchbase.com/company/buddymedia, New York, NY, 3 pages, print date Oct. 14, 2010.
Dalvi et al, "A Translation Model for Matching Reviews to Objects" CIKM, Nov. 2-6, 2009, pp. 167-176 Hong Kong China.

* cited by examiner

*Primary Examiner* — Yves Dalencourt
(74) *Attorney, Agent, or Firm* — Hickman Palermo Truong Becker Bingham Wong LLP

(57) ABSTRACT

A method, apparatus, and computer-readable medium are provided for matching items of user-generated content to entities is provided. Items of user-generated content, such as status updates, are gathered. For each of the items, a machine determines a degree to which the item is associated with an entity. In one aspect, items are matched to an entity by matching the content of the items to attributes of the entity. In another aspect, items are matched to an entity by predicting attributes of an author of the items and determining a distance between the predicted attributes of the author and the attributes of the entity. The distance may be a physical distance between locations of the entity and user or a contextual distance between categories for the entity and posts by the author. Items matched to the entity may be displayed on an interface concurrently with information about the entity.

26 Claims, 7 Drawing Sheets

Access items of user-generated content.
502

For each item, determine a degree to which the item is associated with one or more attributes of an entity.
504

Select a set of items for association with the entity based at least in part on the determined degree to which each item is associated with one or more attributes of the entity.
506

FIG. 5

Access items of user-generated content.
502

For each item, determine a degree to which the item is associated with one or more attributes of an entity.
504

Select a set of items for association with the entity based at least in part on the determined degree to which each item is associated with one or more attributes of the entity.
506

FIG. 6

Access content items generated by an author.
602

Determine a predicted attribute of the author based at least in part on the content items.
604

Select a particular content item of the author for association with an entity having a particular attribute based at least in part on a distance between the particular attribute of the entity and the predicted attribute of the author.
606

MATCHING ITEMS OF USER-GENERATED CONTENT TO ENTITIES

FIELD OF THE INVENTION

The present invention relates to matching items of user-generated content to entities.

BACKGROUND

Various social networking services allow users to generate and share content with each other from almost anywhere. For example, Twitter® allows users to provide minute-by-minute tweets (status updates) by sending text messages from a cell phone, accessing a Web site from a personal computer, or using an application from a smart phone such as an iPhone® or an Android® phone. Facebook®, Myspace®, and LinkedIn® similarly allow users to update their status and otherwise share content with their friends, with groups of friends, or with the general public. Foursquare® and Gowalla® allow users to check into a specified location as a form of status update.

Because these services are free and readily available, users tend to frequently post short items of content, often less than 160 characters. Much of the content includes slang terms, acronyms, and/or incomplete phrases. Social networking services allow an author to freely post this ambiguous content in the social networking context. The posts generally reach friends of the author and subscribers of the author's posts. The readers sometimes understand the content, but the content is not always understood by or even relevant to the readers. The posts often do not reach the readers to whom the content could be the most helpful.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 5 is a diagram illustrating a process for selecting a set of items of user-generated content for association with an entity based at least in part on a degree to which the items are associated with one or more attributes of the entity;

FIG. 6 is a diagram illustrating a process for selecting a particular content item of a user for association with an entity having a particular attribute based at least in part on a distance between the particular attribute of the entity and the predicted attribute of the user.

DETAILED DESCRIPTION

Figure 1:
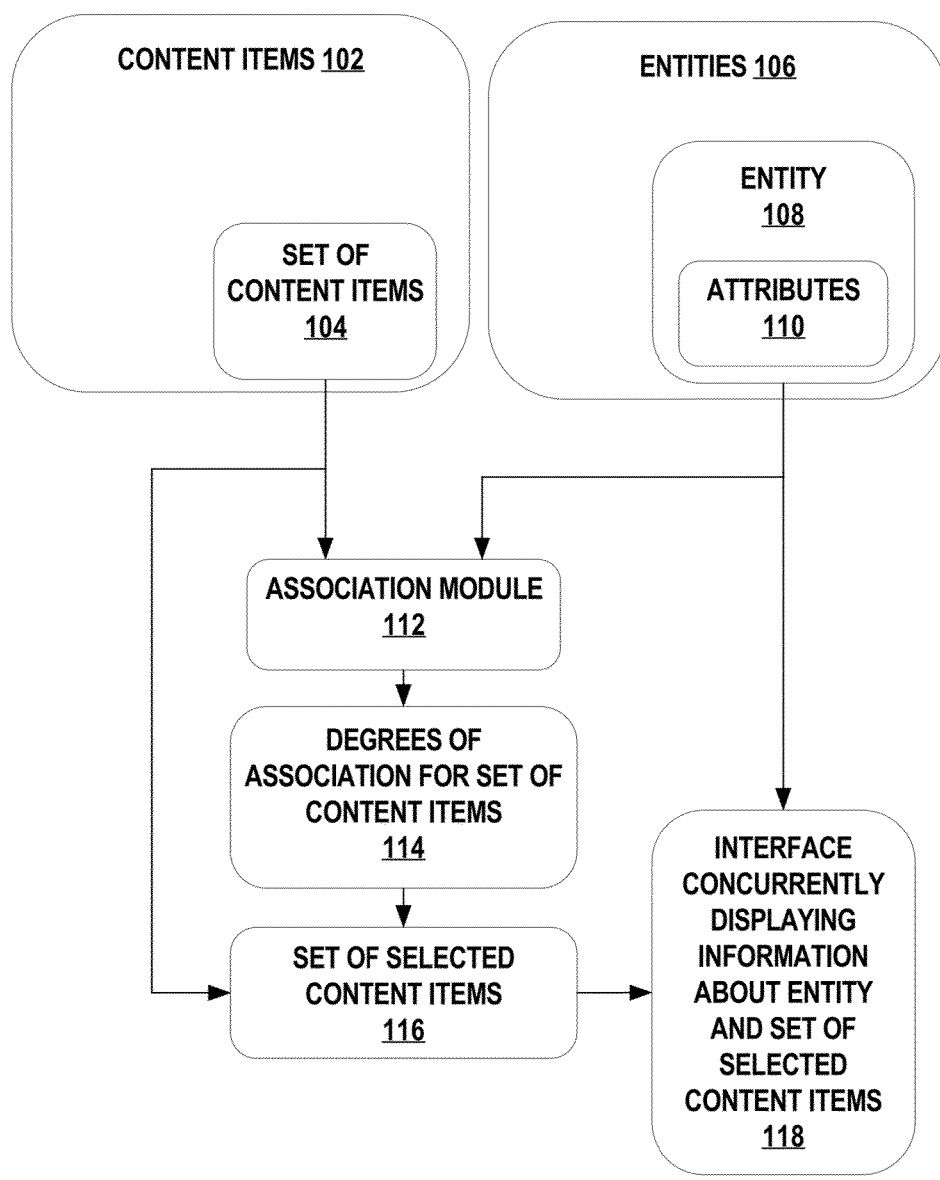
FIG. 1 is a diagram illustrating an example selection of content items that is based at least in part on degrees of association between the content items and an entity.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A method, apparatus, and computer-readable medium are provided for matching items of user-generated content to entities. Items of user-generated content, such as status updates, are gathered. For each of the items, a machine determines a degree to which the item is associated with an entity. In one aspect, items are matched to an entity by matching the content of the items to attributes of the entity. In another aspect, items are matched to an entity by predicting attributes of an author of the items and determining a distance between the predicted attributes of the author and the attributes of the entity. The distance may be a physical distance between locations of the entity and author or a contextual distance between categories for the entity and posts by the author. Items matched to the entity may be displayed on an interface concurrently with information about the entity.

In one embodiment, the items of user-generated content are posts by users of a social networking service. These posts may be less than 160 characters in length and include slang terms, acronyms, and/or incomplete phrases. In one embodiment, a user of one social networking service and a user of another social networking service are identified as a same author or global user based on common profile information. In this manner, content items may be associated with the same author even though the content items were submitted on different social networking services.

In one embodiment, a predicted physical location of the author of the content item is near or at a physical location of the entity. In another embodiment, a predicted category of posts by the author is near or in a category of the entity. In this manner, content items of a user may be associated with an entity even if each individual content item from the user is ambiguous with respect to the entity.

The techniques described herein are not limited with respect to the types of attributes that can be matched between the content item and the entity. In one embodiment, words, phrases, or tags in the content items are associated with a name, nickname, or other words or phrases associated with the entity. In another embodiment, the content item itself mentions a physical location, which is near or at a physical location of the entity. In yet another embodiment, the content item is associated with a user or group of users that are also associated with the entity. In other aspects, entities may reference each other such that the content item is associated with another entity that is related to the entity.

In one embodiment, one or more computing devices match content items to entities using a language model for determining degrees of association between entities and content items based on terms in the content items. Similarly, the one or more computing devices may perform the techniques by using a distance model for determining degrees of association between entities and content items based on distances between entities and locations associated with the content items. In an embodiment, the language model is learned automatically based on words or phrases that are frequently mentioned in unambiguous references to the entities. In another embodiment, a location of a user or group of users is predicted based on the locations of entities to which the user or group of users have unambiguously referred, and a distance model is learned automatically based on the predicted location of the user and the location of the entities to which the user unambiguously refers. Once learned, the models may be updated periodically and used to match content items to entities.

Content Items

Content items, as described herein, include any items of user-generated content that are posted by one or more users of a network of users. There are several social networking services that allow users to generate and share content with each other from almost anywhere. Twitter® allows users to provide minute-by-minute tweets (status updates) by sending text messages from a cell phone, accessing a Web site from a personal computer, or using an application for a smart phone such as an iPhone® or an Android® phone. Facebook®, Myspace®, and LinkedIn® similarly allow users to update their status and otherwise share content with their friends, with groups of friends, or with the general public. Foursquare® and Gowalla® allow users to check into a specified location as a form of status update.

Individual content items may be short and ambiguous. Some social networking services restrict content items to a maximum of 160 characters. Others allow larger content items to be posted even if many of the content items are short. Often, the content includes slang terms, acronyms, and/or incomplete phrases.

Content items may be gathered from several different social networking services. In one embodiment, a user of one social networking service and a user of another social networking service are identified as the same author based on common profile information such as a common email address, a common address, a common name, a common phone number, and/or some other common identifying information. In this manner, content items may be associated with the same author even though the content items were submitted on different social networking services.

Entities

Entities, as described herein, have associated attributes that may include, but are not required to include and are not limited to: a name or nickname of the entity, a physical location of the entity, a category of the entity, a word or phrase associated with the entity, a user or set of users associated with the entity, or another entity associated with the entity. In one embodiment, entities are real-world entities with a name and a physical location. In another embodiment, entities are reference entries in a reference source that provides a description of or attributes of a plurality of reference entries.

In one embodiment, the reference source is an online dictionary or encyclopedia. In one example, the encyclopedia entries are created and modified by users. Wikipedia® is one well-known encyclopedia with reference entries that are created and modified by users. Wikipedia® entries may include a description of an entity, references to other entities, and categories and nicknames for the entity. Words or phrases associated with the entity may be determined based on a frequency or prominence (title versus body, typeface, etc.) of occurrence of the words in the Wikipedia® entry. In the Wikipedia® example, the attributes of a given Wikipedia® entry may be words or phrases used in the given Wikipedia® entry or in other Wikipedia® entries to refer to the given Wikipedia® entry. The attributes may also include a category of the given Wikipedia® entry, names and nicknames of the given Wikipedia® entry, and/or other Wikipedia® entries that refer to and are referred to by the given Wikipedia® entry.

In another embodiment, the entities are directory entries in a directory of businesses or people. For example, Yahoo!® Local includes directory entries of businesses. Each directory entry may include a number of attributes, such as the business name, address, phone number, email address, business category, hours of operation, menu or listing of available goods or services, and descriptions or tags that associate the entity with words or phrases.

Matching Items to Entities

A set of content items are gathered, and one or more content items from the set are matched to an entity. For each of the items, a machine determines a degree to which the item is associated with the entity. In one aspect, items are matched to an entity by matching the content of the items to attributes of the entity. In another aspect, items are matched to an entity by predicting attributes of an author of the items and determining a distance between the predicted attributes of the author and the attributes of the entity. The distance may be a physical distance between locations of the entity and author or a contextual distance between categories for the entity and posts by the author. Items matched to the entity may be displayed on an interface concurrently with information about the entity.

FIG. 1 illustrates an example selection of content items that is based at least in part on degrees of association between the content items and an entity. As shown, content items 102 are gathered from social networking services. From content items 102, a set of content items 104 is associated with attributes 110 of an entity 108 of entities 106. An association module 112 running on one or more computing devices determines various degrees of association 114 between entity 108 and items in set of content items 104. In one embodiment, each item of set of content items 104 is associated with a timestamp, and more recent content items are given a higher degree of association than less recent content items.

In one embodiment, association module 112 associates one or more attributes of items in set of content items 104 with one or more attributes of entity 108 to determine degrees of association 114. In one embodiment, a degree of association between a content item and an entity accounts for a likelihood or probability that the content item refers to the entity. In various embodiments, the degree of association may be based on whether or not the content item mentions a name or nickname of the entity, a word or phrase associated with the entity, or a location of the entity; whether an author of the content item is predicted to be near a physical location of the entity; whether other content items of an author of the content item fall into a same category as the entity; whether the content of the content item falls into a same category as the entity; whether a content item is in a thread that includes a user or set of users associated with the entity; and/or whether the content item is associated with another entity that is related to the entity.

In one embodiment, one or more computing devices match content items to entities using a language model for determining degrees of association between entities and content items based on terms in the content items. In an embodiment, the language model is learned automatically based on words or phrases that are frequently mentioned in unambiguous references to the entities. The model may be updated periodically, and new words or phrases may be added to a list of words or phrases that are likely to be mentioned in a reference to an entity.

Based on degrees of association 114, the one or more computing devices determine a set of selected content items 116 for association with the entity. In one example, items having the highest degrees of association 114 from set of content items 104, or having degrees of association 114 above a specified threshold, are identified as being associated with entity 108. As a result, set of selected items 116 may be stored in association with information about entity 108. As shown, set of selected items 116 are concurrently displayed with information about entity 108 on interface 118. For example, interface 118 may be an interface provided to a browsing user seeking more information about entity 108. As a result, set of selected content items 116 may provide valuable information about entity 108 to the browsing user, who may make a decision to purchase goods or services from entity 108 based on set of selected content items 116.

Figure 2:
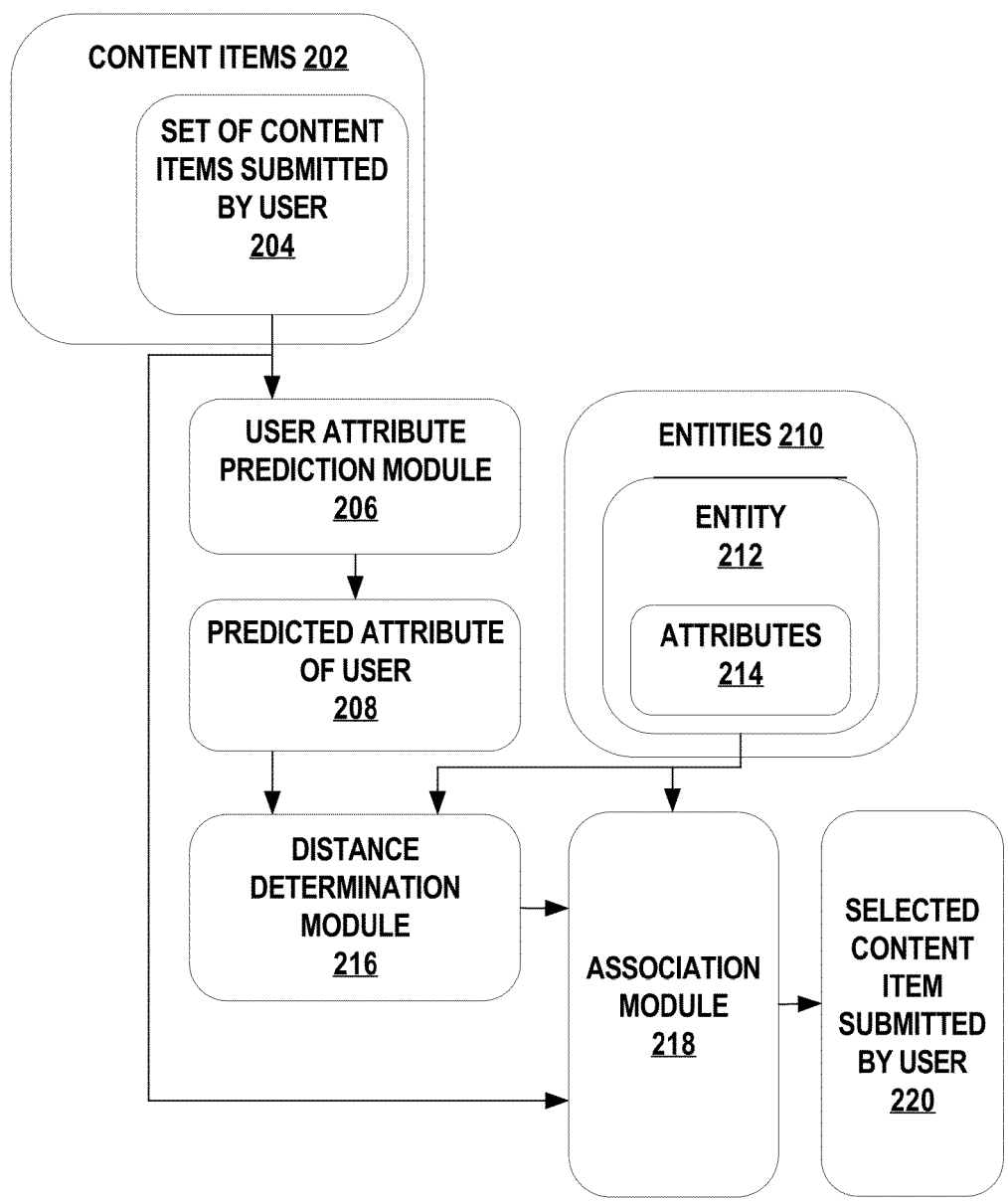
FIG. 2 is a diagram illustrating an example selection of a content item of an author based at least in part on a distance between a predicted attribute of the author and an attribute of an entity.

FIG. 2 illustrates an example selection of a content item of a user based at least in part on a distance between a predicted attribute of the user and an attribute of an entity. A set of content items 204 submitted by a user is determined from gathered content items 202. In an embodiment not shown, the set of content items may be a set of content items submitted by a group of users. For example, users from a particular region may be grouped together. Based at least in part on set of content items 204, user attribute prediction module 206 running on one or more computing devices predicts an attribute 208 of the user. In one example, two or more content items of set of content items 204 contribute to predicted attribute 208. The two or more content items may have been submitted at different times or even on different social networks.

User attribute prediction module 206 may consider any or all content items from a user when predicting an attribute of the user. In one embodiment, each item of set of content items 104 is associated with a timestamp, and more recent content items contribute more to predicted attribute 208 than less recent content items. Stale content items over a certain age may be discarded before predicting the attribute of the user.

In one embodiment, user attribute prediction module 206 predicts a physical location of the user based on locations of entities referenced in set of content items 204 or other locations referenced in set of content items 204. In one example, content items in set of content items 204 unambiguously refer to an entity without mentioning a physical location of the entity. A mention of Disney World, for example, would not need to mention Lake Buena Vista, Fla., in order to be unambiguously tied to the entity, Disney World, which is located in Lake Buena Vista, Fla. Content items unambiguously referring to an entity may be treated as if they mentioned the physical location of the entity. In another example, content in set of content items 204 may include a reference to a Global Positioning System (GPS) location or to some other physical coordinates. For example, social networking applications such as Foursquare® and Gowalla® often insert physical location information into content items or append physical location information to content items. As another example, a user may mention a physical location, such as an address, a neighborhood, a city, a state, or a zip code within the content of a content item.

In addition to predicting a physical location of the user, attribute prediction module 206 may predict a likelihood or probability that the user will post content about entities at varying distances away from a central physical location of the user. In one embodiment, a distance model is learned automatically based on the predicted location of the user and the location of the entities to which the user unambiguously refers. Once learned, the distance model may be updated periodically and used to determine a likelihood or probability that a user is referring to an entity that is located a certain distance away from a predicted location of the user.

In another embodiment, user attribute prediction module 206 predicts one or more categories likely to be discussed by the user based on categories that were discussed in content items 204 or based on categories of entities to which content items 204 unambiguously referred. Categories are related to each other in a hierarchy or tree of categories and sub-categories. A distance between categories may be calculated based on a proximity of the categories in the tree. The distance may also be calculated based on how frequently two categories are mentioned by the same user. In one embodiment, a distance model is learned automatically based on a predicted category discussed by the user. Once learned, the distance model may be updated periodically and used to determine a likelihood that a user is referring to an entity in another category that is a distance away from the predicted category.

FIG. 5 illustrates a process for selecting a set of items of user-generated content for association with an entity based at least in part on a degree to which the items are associated with one or more attributes of the entity. The process is performed by one or more computing devices. In step 502, items of user-generated content are accessed. Step 504 includes, for each of the items, determining a degree to which the item is associated with one or more attributes of an entity. Then, step 506 includes selecting a set of items for association with the entity based at least in part on the determined degree to which each item is associated with one or more attributes of the entity.

FIG. 6 illustrates a process for selecting a particular content item of a user for association with an entity having a particular attribute based at least in part on a distance between the particular attribute of the entity and the predicted attribute of the user. The process is performed by one or more computing devices. In step 602, content items generated by an author are accessed. Step 604 includes determining a predicted attribute of the author based at least in part on the content items. Then, Step 606 includes selecting a particular content item of the author for association with an entity having a particular attribute based at least in part on a distance between the particular attribute of the entity and the predicted attribute of the author.

Interface

Figure 3:
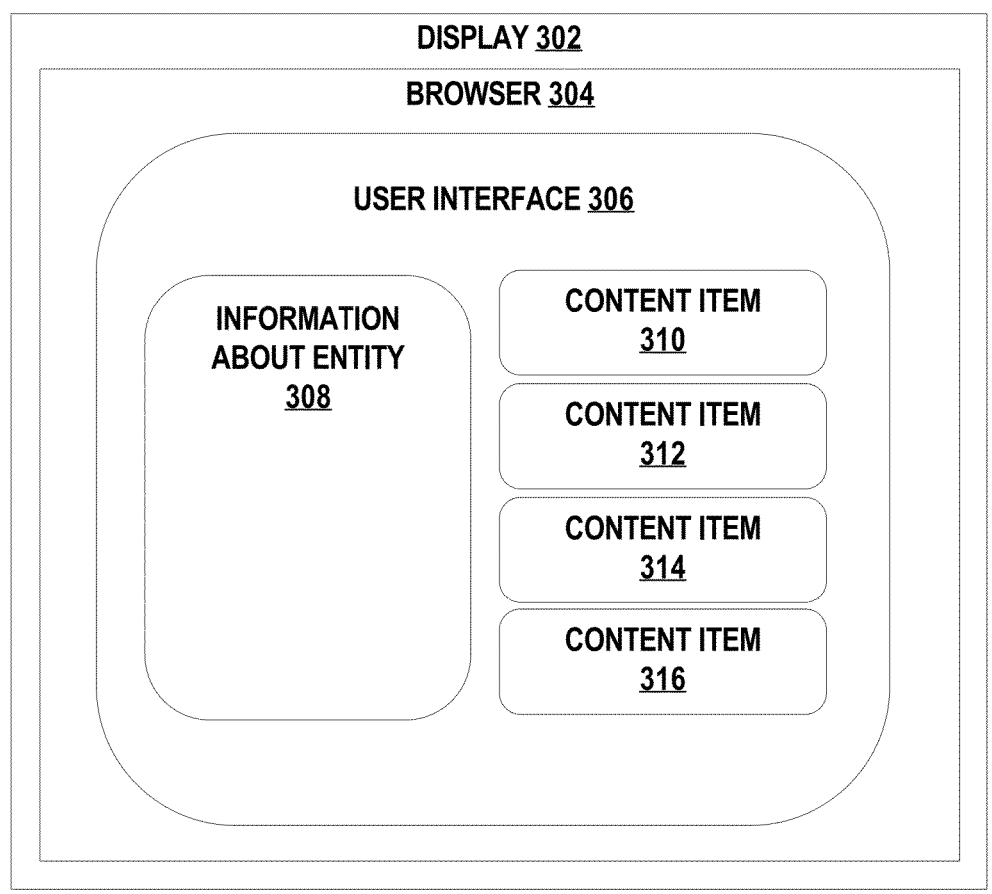
FIG. 3 is a diagram illustrating an example user interface that includes information about an entity and content items associated with the entity.

FIG. 3 illustrates an example user interface that includes information about an entity and content items associated with the entity. Display 302, such as a computer monitor or other display device, displays browser 304 to a browsing user. Browser 304 may include, but is not limited to, Mozilla® Firefox®, Microsoft® Internet Explorer®, or Google® Chrome®, each of which is an application configured to display Web content to a browsing user of the application. User interface 306, as shown, is displayed in browser 304. User interface 306 is not required to be displayed in a browser and could be presented to the user as a separate application or by an application other than a browser. User interface 306 includes information about entity 308 and content items 310-316 that are displayed in association with entity 308. Browsing user may or may not belong to any of the social networks from which content items 310-316 were gathered.

Figure 4:
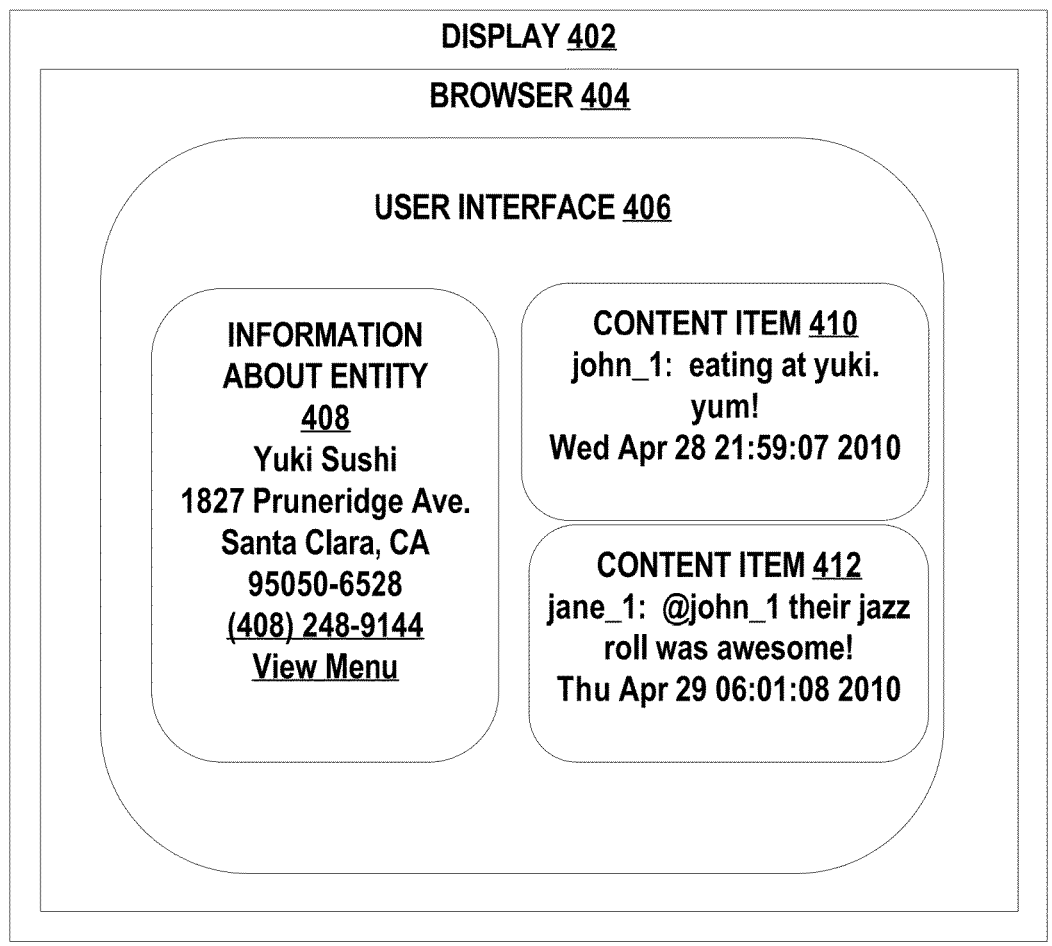
FIG. 4 is a diagram similar to that of FIG. 3, but with reference to a specific entity and specific content items associated with the entity.

FIG. 4 illustrates a user interface similar to the interface of FIG. 3, but with reference to a specific entity and specific content items associated with the entity. In the specific non-limiting example shown, display 402 displays user interface 406 in browser 404. User interface 406 includes information about entity 408. In the example, entity 408 is Yuki Sushi of Santa Clara. Entity 408 may be associated with a number of attributes. As shown, entity 408 is associated with a physical location (the address shown), a phone number, and a menu of food items that are offered at Yuki Sushi. The entity may also be categorized as a restaurant or even as a sushi restaurant. In one example, sushi restaurants may be associated with terms such as "roll," "fish," "tuna," "salmon," "eel," etc. In the example shown, Yuki is associated with terms from the menu, including "jazz roll." As a browsing user is retrieving information about Yuki Sushi, content items 410-412 are displayed along with information about Yuki Sushi. Here, positive experiences from users john__1 and jane__1, as reflected in content items 410-412, may encourage the browsing user to try Yuki Sushi, or even to try a particular menu item at Yuki Sushi.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
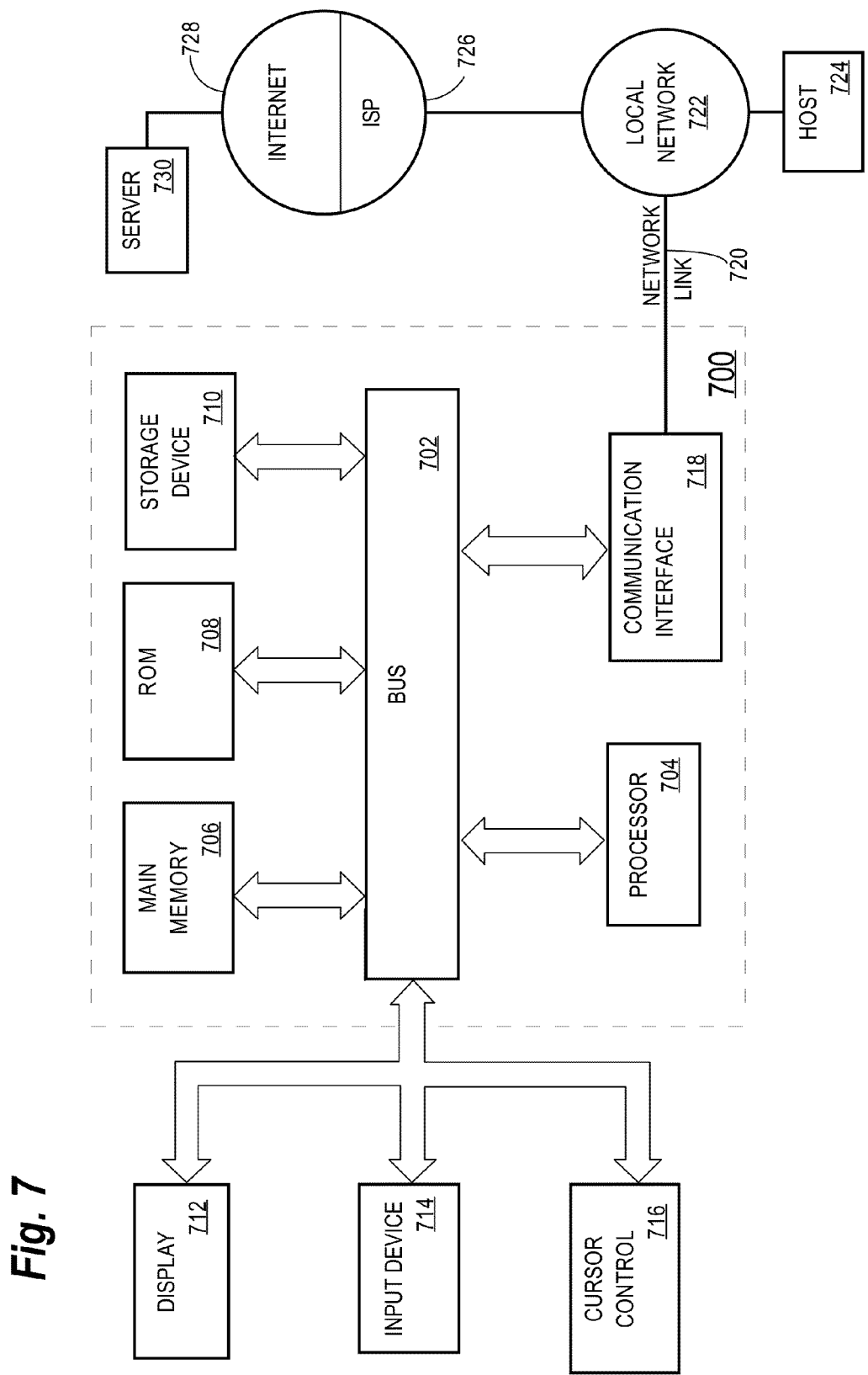
FIG. 7 is a block diagram that illustrates a computer system upon which an embodiment described herein may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory storage media storing instructions which, when executed by one or more computing devices, cause the one or more computing devices to perform:
   accessing a plurality of public posts of user-generated textual content;
   wherein the plurality of public posts comprise a set of two of more posts from a same author;
   for each public post of the plurality of public posts of user-generated textual content, based at least in part on a word or phrase in the textual content of the public post, determining a degree to which the public post is associated with an entity;
   in response to a user's request for information about the entity, performing the steps of:
   selecting a set of public posts from the plurality of public posts that are predicted to be associated with the entity; and
   causing concurrent display, to a user other than the entity, of the selected set of public posts and information retrieved about the entity.

2. One or more non-transitory storage media as recited in claim 1, wherein the plurality of public posts of user-generated content comprise public posts by users of two or more social networking services, and wherein the instructions, when executed by the one or more computing devices, further cause the one or more computing devices to perform:
   identifying a first user of the two or more social networking services as a same author as a second user of another of the two or more social networking services.

3. One or more non-transitory storage media as recited in claim 1, wherein the plurality of public posts of user-generated content comprise posts that are less than 160 characters in length by users of a social networking service.

4. One or more non-transitory storage media as recited in claim 1, wherein determining the degree to which the which the public post is associated with the entity comprises determining a physical distance between the physical location of the entity and a predicted physical location of an author of the public post.

5. One or more non-transitory storage media as recited in claim 1, wherein the entity is referenced using one or more terms in the set of public posts, and wherein determining the degree to which the public post is associated with the entity comprises determining a likelihood that the one or more terms refer to the entity.

6. One or more non-transitory storage media as recited in claim 1, wherein determining the degree to which the public post is associated with the entity is based at least in part on one or more attributes of the entity, wherein the one or more attributes comprise one or more of: a name or nickname of the entity, a physical location of the entity, a category of the entity, a word or phrase associated with the entity, a user or set of users associated with the entity, or another entity associated with the entity.

7. One or more non-transitory storage media as recited in claim 1, wherein, for a particular public post of the plurality of public posts, determining the degree to which the particular public post is associated the entity is based at least in part on one or more other public posts generated by a same author as the particular public post.

8. One or more non-transitory storage media storing instructions which, when executed by one or more computing devices, cause the one or more computing devices to perform:
   accessing a plurality of public posts of content generated by an author;
   determining a predicted attribute of the author, wherein at least two of the plurality of public posts of content contribute to the predicted attribute of the author;
   selecting a particular public post of content of the author for association with an entity having a particular attribute based at least in part on a distance between the particular attribute of the entity and the predicted attribute of the author.

9. One or more non-transitory storage media as recited in claim 8, wherein the predicted attribute is a predicted physical location of the author, and wherein the particular attribute is a physical location of the entity.

10. One or more non-transitory storage media as recited in claim 8, wherein the predicted attribute is one or more predicted categories for the author, and wherein the particular attribute is a category of the entity.

11. One or more non-transitory storage media as recited in claim 8, wherein the instructions, when executed by the one or more computing devices, further cause the one or more computing devices to perform:

causing the selected particular public post to be displayed on an interface concurrently with information about the entity.

12. One or more non-transitory storage media as recited in claim 8, wherein a first public post of the plurality of public posts of content were generated by a first user using a first social networking service, and a second public post of the plurality of public posts of content were generated by a second user using a second social networking service, and wherein the instructions, when executed by the one or more computing devices, further cause the one or more computing devices to perform:

determining that the first public post and the second public post were generated by a same author.

13. One or more non-transitory storage media as recited in claim 8, wherein the plurality of public posts of content comprise posts that are less than 160 characters in length by the author, and wherein the author is a user of a social networking service.

14. A method comprising:

accessing a plurality of public posts of content generated by an author;

determining a predicted attribute of the author, wherein at least two of the plurality of public posts of content contribute to the predicted attribute of the author;

selecting a particular public post of content of the author for association with an entity having a particular attribute based at least in part on a distance between the particular attribute of the entity and the predicted attribute of the author;

wherein the method is performed by one or more computing devices.

15. The method of claim 14, wherein the predicted attribute is a predicted physical location of the author, and wherein the particular attribute is a physical location of the entity.

16. The method of claim 14, wherein the predicted attribute is one or more predicted categories for the author, and wherein the particular attribute is a category of the entity.

17. The method of claim 14, further comprising:

causing the selected particular public post to be displayed on an interface concurrently with information about the entity.

18. The method of claim 14, wherein a first public post of the plurality of public posts were generated by a first user using a first social networking service, and a second public post of the plurality of public posts were generated by a second user using a second social networking service, further comprising:

determining that the first public post and the second public post were generated by a same author.

19. The method of claim 14, wherein the plurality of public posts comprise posts that are less than 160 characters in length by the author, and wherein the author is a user of a social networking service.

20. A method comprising:

accessing a plurality of public posts of user-generated textual content;

wherein the plurality of public posts comprise a set of two of more posts from a same author;

for each public post of the plurality of public posts of user-generated textual content, based at least in part on a word or phrase in the textual content of the public post, determining a degree to which the public post is associated with an entity;

in response to a user's request for information about the entity, performing the steps of:

selecting a set of public posts from the plurality of public posts that are predicted to be associated with the entity; and causing concurrent display, to a user other than the entity, of the selected set of public posts and information retrieved about the entity;

wherein the method is performed by one or more computing devices.

21. The method of claim 20, wherein the plurality of public posts of user-generated content comprise public posts by users of two or more social networking services, and further comprising:

identifying a first user of the two or more social networking services as a same author as a second user of another of the two or more social networking services.

22. The method of claim 20, wherein the plurality of public posts of user-generated content comprise posts that are less than 160 characters in length by users of a social networking service.

23. The method of claim 20, wherein determining the degree to which the which the public post is associated with the entity comprises determining a physical distance between the physical location of the entity and a predicted physical location of an author of the public post.

24. The method of claim 20, wherein the entity is referenced using one or more terms in the set of public posts, and wherein determining the degree to which the public post is associated with the entity comprises determining a likelihood that the one or more terms refer to the entity.

25. The method of claim 20, wherein determining the degree to which the public post is associated with the entity is based at least in part on one or more attributes of the entity, wherein the one or more attributes comprise one or more of: a name or nickname of the entity, a physical location of the entity, a category of the entity, a word or phrase associated with the entity, a user or set of users associated with the entity, or another entity associated with the entity.

26. The method of claim 20, wherein, for a particular public post of the plurality of public posts, determining the degree to which the particular public post is associated the entity is based at least in part on one or more other public posts generated by a same author as the particular public post.

\* \* \* \* \*